UNITED STATES PATENT OFFICE.

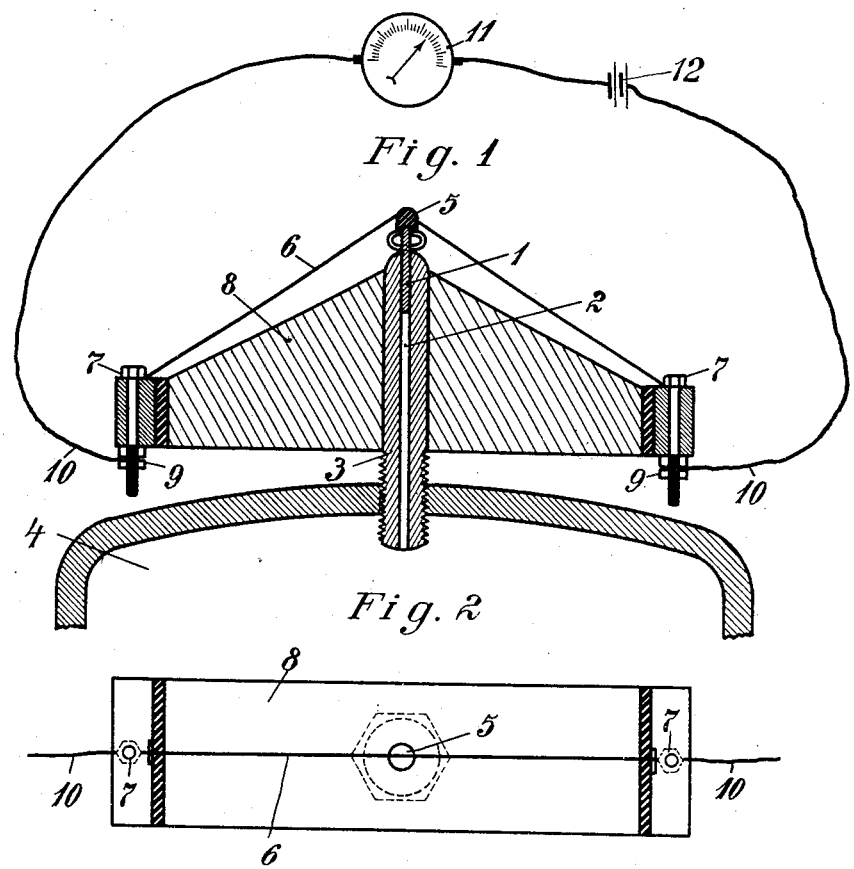

WALTHER NERNST, OF BERLIN, GERMANY, ASSIGNOR TO THE FIRM SIEMENS & HALSKE AKTIENGESELLSCHAFT, OF BERLIN-SIEMESSTADT, GERMANY.

PRESSURE-MEASURING INSTRUMENT.

1,395,653.  Specification of Letters Patent.  Patented Nov. 1, 1921.

Application filed June 14, 1919. Serial No. 304,284.

*To all whom it may concern:*

Be it known that I, WALTHER NERNST, of 26ª Am Karlsbad, Berlin, Germany, have invented certain new and useful Improvements in Pressure-Measuring Instruments, for which I have filed application in Germany, May 23, 1918, of which the following is a specification.

My invention refers to the measuring and recording of quickly varying pressures and other forces and its particular object is a device adapted for this purpose.

The devices used hitherto for measuring and recording quickly varying pressures are not adapted for recording the gas pressure in the chamber of a gun or for ascertaining the variation of pressure in explosion cylinders for testing gun powder, in recoil brakes and the like. With a device according to the present invention all these pressures and also the variation of pressure in the cylinders of internal combustion engines and the like can easily be measured and recorded with great exactness.

The new device is based upon the reversible variation of the electric resistance within a wire placed under varying tension. I have ascertained that this variation of resistance takes place practically at once and it can be recorded photographically in the simplest manner by aid of an oscillograph. The electric transmission between the wire and the recording instrument offers the advantage that this latter can be placed so as to be free of all shocks and vibrations. It is only necessary to so construct the measuring device itself that the shocks which arise for instance on the gun being fired do not give rise to secondary variations of the resistance of the wire. I prefer using a steel wire which on being stretched within the limits of elasticity shows an increase of electric resistance in proportion to the stretching power up to about four per cent. In order to obviate the disturbing influence of secondary variations of temperature I prefer in some cases using a resistance material having practically no coefficient of temperature of the galvanic conductivity.

In the drawings affixed to this specification and forming part thereof, the preferred form of a device according to the present invention is shown diagrammatically, Figure 1 being a vertical section and Fig. 2 a plan.

Referring to the drawings, 1 is a piston snugly fitting in the boring 2 of a tube 3 connected with the chamber 4 whose pressure shall be measured and recorded. An insulated cap 5 is placed on top of the piston and the resistance wire 6 fastened at two ends to screws 7 is firmly stretched across said cap 5. The screws 7 located in borings of the carrier 8 carrying also the tube 3 are electrically connected with the terminals 9 connected by wires 10 with a measuring and recording instrument 11, a source of electric current 12 being included in the instrument circuit.

All variations of pressure taking place within the chamber 4 will cause the piston 1 to alter its position with regard to the tube 3 and to stretch the wire 6, thus causing its electric resistance to rise, such increase of resistance being at once transmitted to and recorded by the measuring instrument.

I prefer placing the wire 6 in oil and further to surround it by asbestos in order to have an oil skin adhere to it also whenever shocks or vibrations occur, whereby all instantaneous variations of the temperature can be obviated.

Apart from the particular manner in which the stretching of the wire is effected in the device described above there are many ways of obtaining the same result and I claim all such devices as falling within the range of my invention which is not confined to any special manner but covers all devices adapted to transmit pressure to a wire so as to stretch it and thereby to vary its electric conductivity which is then recorded by a suitable instrument.

I claim:—

1. A device of the kind described, comprising a wire formed of a material whose electric resistance increases in proportion to the tension applied thereto, means for applying tension to the wire including a pressure responsive member, and an electric measuring instrument and generating means in circuit with said wire, whereby the said instrument may be used to measure such pressure.

2. A device of the kind described comprising a support, a wire fixed at both ends to said support, an electric measuring instrument and generating means connected to the ends of said wire and pressure responsive means operatively connected with a point intermediate between the ends of said wire for placing it under tension.

3. A device of the kind described comprising a wire formed of a material whose electric resistance increases in proportion to the tension applied thereto, and a cylinder and a piston movable within said cylinder, said piston being operatively connected with said wire so as to stretch it whenever the pressure within said cylinder increases, and an electric measuring instrument and generating means in circuit with said wire, whereby said instrument may be used to measure said pressure.

4. A device of the kind described comprising a support, a wire fixed at both ends to said support, an electric measuring instrument and generating means connected to the ends of said wire, a cylinder and a piston movable within said cylinder, said piston being in contact with a point intermediate between the ends of said wire so as to stretch it whenever the pressure within said cylinder increases.

In testimony whereof, I affix my signature in presence of two witnesses.

Dr. WALTHER NERNST.

Witnesses:
Max Jablouski,
Kaphe Seech.